United States Patent
Carayon

(10) Patent No.: US 10,549,224 B2
(45) Date of Patent: Feb. 4, 2020

(54) FILTER PANEL SCREEN FOR A WATER INTAKE INCLUDING FILTER MEMBER WITH FRUSTO-CONICAL FILTER SURFACE

(71) Applicant: E. BEAUDREY ET CIE, Paris (FR)

(72) Inventor: Laurent Carayon, Garches (FR)

(73) Assignee: E. BEAUDREY ET CIE, Paris (FR)

( * ) Notice: Subject to any disclaimer, the term of this patent is extended or adjusted under 35 U.S.C. 154(b) by 0 days.

(21) Appl. No.: 16/287,729

(22) Filed: Feb. 27, 2019

(65) Prior Publication Data

US 2019/0193004 A1    Jun. 27, 2019

Related U.S. Application Data

(60) Division of application No. 15/816,225, filed on Nov. 17, 2017, now Pat. No. 10,391,429, which is a
(Continued)

(30) Foreign Application Priority Data

Aug. 2, 2011 (FR) ...................................... 11 57082

(51) Int. Cl.
*B01D 33/073* (2006.01)
*B01D 33/50* (2006.01)
(Continued)

(52) U.S. Cl.
CPC ......... *B01D 33/073* (2013.01); *B01D 33/503* (2013.01); *B01D 33/801* (2013.01);
(Continued)

(58) Field of Classification Search
None
See application file for complete search history.

(56) References Cited

U.S. PATENT DOCUMENTS

| 1,188,340 | A | * | 6/1916 | Tark | ...................... | B01D 33/04 |
|---|---|---|---|---|---|---|
| | | | | | | 15/88.4 |
| 1,210,759 | A | | 1/1917 | Breddin | | |

(Continued)

FOREIGN PATENT DOCUMENTS

| DE | 637 108 | 10/1936 |
|---|---|---|
| DE | 734 268 | 4/1943 |

(Continued)

OTHER PUBLICATIONS

French Search Report, dated Jan. 19, 2012, from corresponding French application.

*Primary Examiner* — Robert J Popovics
(74) *Attorney, Agent, or Firm* — Young & Thompson

(57) ABSTRACT

A device for filtering a stream of water in a channel (2), includes:
  a wall (6) adapted to be mounted in the channel and including a through-opening,
  a filter member (10) mounted on the wall opposite the through-opening and including a filter surface projecting relative to the wall, the filter surface having a larger area than would have a flat filter surface fitted in the through-opening, the filter member including retaining members face to face with the filter surface for retaining the bodies that do not pass through the surface,
  a suction device disposed facing the retaining members, and
  elements for driving the filter member and/or the suction device in a relative movement of one in relation to the other such that the suction device is successively brought face to face with each retaining member.

7 Claims, 6 Drawing Sheets

CROSS-SECTION IN
PLAN VIEW ON CC

Related U.S. Application Data continuation of application No. 13/562,669, filed on Jul. 31, 2012, now Pat. No. 9,968,872.

(60) Provisional application No. 61/529,408, filed on Aug. 31, 2011.

(51) Int. Cl.
   *B01D 33/80* (2006.01)
   *E03F 5/14* (2006.01)

(52) U.S. Cl.
   CPC ............ *E03F 5/14* (2013.01); *B01D 2201/02* (2013.01); *B01D 2201/082* (2013.01)

(56) References Cited

U.S. PATENT DOCUMENTS

| | | | |
|---|---|---|---|
| 1,516,693 A | 11/1924 | Anthony | |
| 2,013,971 A * | 9/1935 | Raisch | B01D 33/06 210/107 |
| 2,022,336 A * | 11/1935 | Bower | E02B 5/085 210/157 |
| 2,142,737 A | 1/1939 | Schaaf | |
| 2,295,937 A * | 9/1942 | Crane | B01D 33/067 210/403 |
| 2,624,461 A | 1/1953 | Falconer | |
| 3,108,951 A * | 10/1963 | Scheel | B01D 33/11 210/199 |
| 3,606,735 A * | 9/1971 | Baigas | B01D 46/26 210/391 |
| 3,622,006 A * | 11/1971 | Brunner | B01D 35/02 210/355 |
| 3,812,967 A * | 5/1974 | Rudzinski | B01D 33/067 210/174 |
| 3,825,124 A * | 7/1974 | Davis | B01D 33/27 210/330 |
| 4,038,187 A * | 7/1977 | Saffran | B01D 33/067 210/108 |
| 4,062,776 A * | 12/1977 | Blok | B01D 33/11 210/205 |
| 4,140,629 A * | 2/1979 | Martindale | B01D 33/11 209/240 |
| 4,192,749 A | 3/1980 | Jackson | |
| 4,210,539 A | 7/1980 | Shiban | |
| 4,251,370 A | 2/1981 | Stengelin | |
| 4,521,305 A | 6/1985 | Deal | |
| 4,551,248 A * | 11/1985 | Lenac | B01D 33/09 210/404 |
| 4,676,893 A | 6/1987 | Travade et al. | |
| 5,094,751 A | 3/1992 | Ramsey et al. | |
| 5,116,490 A | 5/1992 | Fontenot | |
| D327,693 S | 7/1992 | Berry | |
| 5,300,225 A | 4/1994 | Fischer | |
| 5,378,364 A * | 1/1995 | Welling | B01D 33/11 210/512.1 |
| 5,464,542 A | 11/1995 | Grienberger et al. | |
| 5,851,087 A * | 12/1998 | Berry, III | B01D 29/15 405/127 |
| 6,089,790 A * | 7/2000 | Berry, III | B01D 29/15 138/41 |
| 7,267,763 B2 | 9/2007 | Jackson | |
| 7,347,933 B2 | 3/2008 | Berry, III et al. | |
| 7,615,148 B1 * | 11/2009 | Gentry | B01D 35/02 210/170.07 |
| 7,985,272 B2 * | 7/2011 | Higgins | B01D 45/14 209/233 |
| 8,083,939 B2 * | 12/2011 | Dowsett | B01D 29/96 210/232 |
| 9,968,872 B2 * | 5/2018 | Carayon | B01D 33/073 |
| 10,124,281 B2 * | 11/2018 | Heilman | B01D 35/30 |
| 10,391,429 B2 * | 8/2019 | Carayon | B01D 33/503 |
| 2001/0054591 A1 | 12/2001 | Gorshing | |
| 2004/0112825 A1 | 6/2004 | Villares Lenz Cesar | |
| 2005/0126967 A1 | 6/2005 | Berry, III et al. | |
| 2005/0279680 A1 | 12/2005 | Jackson | |
| 2006/0037897 A1 | 2/2006 | Jackson | |
| 2007/0090041 A1 | 4/2007 | Berry, III et al. | |
| 2008/0230460 A1* | 9/2008 | Dowsett | B01D 29/96 210/230 |
| 2011/0030324 A1* | 2/2011 | Higgins | B01D 45/14 55/400 |
| 2012/0248018 A1* | 10/2012 | Hopf | B01D 29/333 210/158 |
| 2013/0032515 A1 | 2/2013 | Carayon | |
| 2015/0265952 A1* | 9/2015 | Berry, IV | B01D 33/461 210/396 |
| 2017/0036143 A1* | 2/2017 | Van den Berg | B01D 33/073 |
| 2018/0028950 A1* | 2/2018 | Heilman | B01D 35/30 |
| 2018/0071663 A1* | 3/2018 | Carayon | B01D 33/073 |
| 2019/0193004 A1* | 6/2019 | Carayon | B01D 33/503 |

FOREIGN PATENT DOCUMENTS

| | | |
|---|---|---|
| EP | 0 160 590 | 11/1985 |
| EP | 0 525 753 | 2/1993 |
| FR | 2 874 334 | 2/2006 |

* cited by examiner

VIEW ON BB

CROSS-SECTION IN
PLAN VIEW ON CC

DETAIL D

DETAIL E

CROSS-SECTION IN
PLAN VIEW ON CC

CROSS-SECTION IN
PLAN VIEW ON CC

FILTER PANEL SCREEN FOR A WATER INTAKE INCLUDING FILTER MEMBER WITH FRUSTO-CONICAL FILTER SURFACE

BACKGROUND OF THE INVENTION

Field of the Invention

The present invention relates to filtration devices such as for example filter panel screens equipping water intakes, whether they be water intakes in rivers or in the sea, to stop debris and particles conveyed by the water to extract.

Description of Related Art

Generally, a screen for a water intake is normally disposed downstream of a grating of bars which are spaced apart by a few centimeters protecting the screen from debris of large size, either in isolation, or in association with one or more other screens of the same type belonging to the same screening station.

In known manner, the filter member, of which the mesh openings are only a few millimeters across, is generally movable in order to be periodically cleared of debris and particles which, having dimensions greater than those of the mesh openings, progressively obstruct all of them and thus clog the filter member.

Such a movable filter member may be constituted by a panel which can be raised in its own plane, alternating with another panel of the same type disposed parallel to the preceding one, at a distance therefrom.

Such a filter member may also be constituted by an endless loop, of elongate cross-section, for the constitution of a filter band, also referred to as a thru-flow or dual flow band screen.

Such a filter member may also be constituted by an endless loop, of cylindrical or polygonal cross-section, for the constitution of a drum screen.

Whatever the case, such a movable filter member for a water intake, whether it be a filter panel screen, a filter band or a drum screen, passes cyclically from an immersion position in which it becomes progressively loaded with debris and various particles, to a non-immersion position. In the latter position, it is subjected to the effects of water jets under pressure acting in a counter-flow direction to rid it of particles and debris so applied to its surface and to thereby make it suitable once again to assume its filtration function during its later immersion.

The particles and debris thus taken by the washing water are typically collected collectively, in a trough provided for that purpose and are removed to a drain by it.

If fish are present on the panels, they are thus removed from the water and subjected to impacts which most often kill them.

Similarly, certain leakages may occur between the panels themselves, or between them and the fixed lateral uprights of the filter frame.

Furthermore, the fish that are trapped or carried away by the movable filter member of a screen at such a water intake, are irremediably subjected to:
 a passage, often prolonged, out of the water, during the phase of non-immersion of that filter member,
 the action of the washing water jets applied to it, which is most often brutal and
 the violent projection resulting therefrom, into the trough provided for the retrieval of all the particles and debris that had temporarily clogged the filter member in question.

Thru-flow band screens, that is to say filter bands for which only the upstream face of the filter apron receives the water to filter, also have various drawbacks, which are the following:

First of all, at the bottom of the sluice, it is necessary to provide, at the base of the filter apron, for sealing between it and said base, a sealing plate, referred to as foot plate, which must be tangential to said apron.

However, given the inevitable tolerances for manufacturing, for assembly and for wear of the parts and, in particular, of that of the apron-carrying chains, a minimum clearance always remains between such a foot plate and the filter apron and, in practice, this clearance is never less than approximately 6 mm, and even frequently exceeds this value.

It follows that, in order to be consistent, the filter aprons of such thru-flow band screens cannot be equipped with mesh openings less than 6 mm across, and that the efficacy of treatment provided is thereby limited accordingly.

As concerns dual flow band screens, the filter apron has generatrices parallel to the direction of flow of the water stream to filter.

Both faces of this filter apron have, in parallel, identical roles, either with said stream flowing from the outside to the inside of the filter apron through each of the faces thereof, or with it flowing in the opposite direction.

The frame bearing such dual flow band screens is usually disposed against small masonry walls, one facing the other in the sluice to be equipped.

With no sealing needing to be provided at the foot of their apron, such dual flow band screens have the advantage of enabling the utilization for that screen of smaller mesh openings, for example less than 0.5 mm, without inconsistency with any other sealing.

They also have the advantage of enabling simultaneous use of both faces of their apron and thus of doubling, for the same volume, the effective filtration area, that is to say the capacity of the equipment.

Nevertheless, dual flow band screens give no improvement in the survival of fish relative to thru-flow band screens.

Admittedly, various devices have already been proposed for equipping a water intake screening station, for the purpose of ensuring the protection of living components and, in particular, fish, conveyed by the water to extract. However, in the embodiments of this type known to date, this has concerned either special filters, not in themselves ensuring the protection of the fish without any general screening function at all, or conventional screening filters obliging a passage out of water for the fish collected.

BRIEF SUMMARY OF THE INVENTION

The present invention thus generally relates to enabling filtration or screening to be provided, in particular for a water intake, while not having the drawbacks of the prior structures, and, where applicable, also enabling fish to be protected.

Furthermore, for the installation currently equipped with thru-flow band screens, the problem is increasingly arising of improving the efficacy of screening by reducing the dimensions of the debris or organisms that can be retained.

However, to date, their substitution by apparatus providing at least the same function, without having the drawbacks thereof and without modification of the construction works or hydraulic disturbance, cannot easily be achieved either, as the physical conditions for their implementation are different.

The filter panel screen of the French patent filed under the number 0406776 fully solves this problem. It is however limited in capacity when required to treat a high flow or to screen very finely. In both these cases, the head loss of the screen increases.

In order to solve these difficulties, the present invention enables the area of the filter surface presented to the fluid to be increased while retaining the operating principles of the screen of the aforementioned patent.

The present invention thus relates to a filter device or filter member screen with a large filtration surface.

According to a first aspect, the invention concerns a device for filtering a stream of water in a channel, characterized in that the device comprises:
- a frame-forming wall adapted to be mounted in the channel and which comprises a through-opening,
- a filter member mounted on the frame-forming wall opposite the through-opening and which comprises a filter surface projecting relative to the wall, the filter surface having a larger area than would have a flat filter surface fitted in the through-opening, the filter member comprising retaining members provided face to face with the filter surface in order to retain the solid bodies that do not pass through the filter surface,
- at least one suction device which is disposed facing the retaining members,
- means for driving the filter member and/or said at least one suction device in a relative movement of one in relation to the other such that said at least one suction device is successively brought face to face with each retaining member.

Such a device has a filtration surface of much greater area than the circular filter surface of the screen of the aforementioned prior art, which enables a higher water flow to be treated.

To be precise, the filter surface according to the invention extends from the frame-forming wall, forming a three-dimensional surface (a surface that is not flat) instead of the two-dimensional surface of the prior art.

According to a possible feature, the filter surface is cylindrical, which in a particularly simple manner considerably increases the size of the filter surface of the prior art. The height of the cylindrical surface which corresponds to the dimension in which it extends from the frame-forming wall or the diameter of the cylindrical surface may be modified according to the filtering/screening capacity it is wished to give the device.

If the height of the cylindrical surface becomes too great relative to the diameter of the cylinder, bending forces are thus created at the foot of the axis fastened to the wall. In these circumstances a support for the free end of the surface may be necessary in order to avoid deformations thereof under the effect of its weight.

According to a possible feature, the axis of revolution of the cylindrical filter surface is disposed perpendicularly to the through-opening of the frame-forming wall.

This configuration is particularly simple. The cylindrical filter surface is positioned in front of the opening of the wall and is open at its end that faces the opening in order for the water to pass through the filter member, enter inside the filter cylinder and escape by the opening in the downstream direction relative to the wall.

An opposite flow of the water may also be envisaged. It should be noted that in this case the retaining members are disposed inside the cylindrical filter surface and not outside.

In the configuration presented above the free end of the filter surface is closed in order to force the flow of water through the cylindrical filter surface.

According to a possible feature, the retaining members are disposed parallel to each other along generatrices of the cylindrical filter surface.

These members thereby form longitudinal compartments at the outer periphery of the cylindrical filter surface.

This arrangement of compartments is particularly simple to produce and effective.

According to a possible feature, the aforementioned retaining members are formed by two partitions spaced apart parallel to each other, arranged along generatrices of the cylindrical filter surface.

These longitudinal partitions are generally distributed around the filter surface.

According to another possible embodiment, the filter surface is conical and not cylindrical as described above.

In this configuration, the base of the cone is in contact with the frame-forming wall and the conical filter surface extends away from the wall, substantially perpendicularly thereto towards the point of the cone.

It should be noted that the filter surface may alternatively be frusto-conical.

The retaining members arranged on the periphery of the conical filter surface are then disposed along generatrices of the cone and thereby, in a plan view, form compartments of triangular general shape, the point of the triangle being directed towards the point of the cone.

Here too, the increase in the area of the filter surface resulting from such a shape enables a higher flow of water to be treated/screened than the circular filter surface of the screen of the prior art dealt with above.

It should be noted that when a conical or frusto-conical filter surface is used with an opposite water flow, that is to say that the water first of all passes through the opening in the frame-forming wall, then enters inside the filter surface and passes therethrough to come out again downstream thereof on the other side of the filtration device, the retaining members are disposed within the conical surface and not outside.

According to another possible feature, the filter member is movable whereas said at least one suction device is fixed.

According to another possible alternative feature, the filter member is fixed whereas said at least one suction device is movable.

According to another possible alternative feature, the filter member and said at least one suction device are movable.

It should be noted that, whatever the embodiment presented above, a relative movement must be established between the filter member (whatever the form of the filter surface) and the suction device or devices in order for the latter device or devices to be brought successively face to face with each retaining member to suck away the various solid bodies stopped by the filter surface.

According to a possible feature, the drive means are adapted to rotationally drive the filter member, the suction device or devices, or both.

It should be noted that in the embodiment in which the filter member and the suction device or devices are movable, separate drive means are provided to drive the movement of each of them.

The rotational movement of the aforesaid part or parts is a particularly simple movement to make.

According to another possible feature, the suction device or each suction device if therefore several of them, comprises a suction unit (for example: a pump, ejector, gravity flow, etc.) and a suction nozzle, it being possible for one suction unit (for example a pump) to be common to several nozzles.

The suction nozzle is adapted to be positioned facing the retaining members and to successively sweep each of them during the relative movement between the suction device and the filter member.

According to another possible feature, the suction nozzle is of elongate general shape and comprises an envelope-forming wall which, in cross-section, has an open profile provided with an opening face to face with the retaining members. For example, the opening is formed in an arcuate lip parallel and tangential to the filter surface, fastened to the suction unit. This arcuate lip prevents the water that is sucked away from being unfiltered water that has passed around the suction unit and not water coming from inside the Such a shape is for example obtained from a plate of substantially rectangular shape bent around a cylinder in order to bring the two longitudinal edges of the plate (the long sides) to face each other but in spaced apart relationship, to form an opening between them.

It should moreover be noted that another method for forming such a suction nozzle may consist of forming a slot in a hollow cylindrical tube, over the entire height thereof, then of slightly spreading the free edges bounding the axial slot so formed in order to enlarge it and obtain the desired shape.

According to a possible feature, the general shape of the open profile is that of a U or a C.

Such a profile is particularly adapted to cooperate with the retaining members of the filter member.

According to a possible feature, in plan view, the opening has a substantially rectangular outline of dimensions equal to or greater than those of the facing retaining members.

Such an opening is particularly well adapted to the configuration of the retaining members of the filter member provided with a cylindrical filtration surface.

According to another aspect, the invention is also is directed to an installation comprising a channel in which water flows and a device for filtering the stream of water in the channel, characterized in that device comprises:
- a frame-forming wall mounted in the channel and which comprises a through-opening,
- a filter member mounted on the frame-forming wall opposite the through-opening and which comprises a filter surface projecting relative to the wall in the upstream direction, the filter surface having a larger area than would have a flat filter surface fitted in the through-opening, the filter member comprising retaining members provided face to face with the filter surface upstream thereof in order to retain the solid bodies that do not pass through the filter surface, or downstream if the direction of flow of the water is from the inside to the outside,
- at least one suction device which is disposed opposite the retaining members upstream thereof,
- means for driving the filter member and/or said at least one suction device in a relative movement between them such that said at least one suction device is successively brought face to face with each retaining member in order to locally generate, through the filter member, a counter-flow of water successively opposite each retaining member.

The filtration devices may thus be easily installed in a channel such as a sluice.

The features and advantages stated above in relation to the filtration device also apply to the installation dealt with above.

According to a more specific possible configuration of the device of the invention, the device/screen comprises a frame suitable to be connected to a water intake and a cylindrical filter panel axially interposed in a cylindrical opening of said frame, while being fastened to said frame, said cylindrical filter panel comprising a cylinder with a horizontal axis and comprising longitudinal retaining members which are disposed upstream of the cylindrical filter panel and fastened thereto. A suction device is disposed upstream of the retaining members and means for driving the cylindrical panel and/or the suction device in a relative rotary movement are provided so as to generate locally, through the cylindrical filter panel, a counter-flow successively opposite each retaining member, according to said relative rotary movement, to successively take the debris and particles retained by them and direct them through a take-off pipe adapted to remove said debris and particles so taken to the outside.

According to a first possible embodiment, the cylindrical filter panel is fixed whereas the drive means are adapted to rotate the cylindrical suction device.

According to a second possible embodiment, the suction device is fixed whereas the drive means are adapted to rotate the cylindrical filter panel.

According to a third possible embodiment, the drive means are adapted to rotate the suction device and the cylindrical filter panel.

In practice, the suction device comprises a suction pump and a suction nozzle.

Preferably, the external volume of the cylindrical filter panel is fragmented in a circular manner into compartments by longitudinal partitions forming the retaining members and the suction nozzle comprises, in plan view, a rectangular outline equivalent to or somewhat greater than one of such a compartment.

As a variant, the suction device comprises two nozzles disposed respectively on opposite sides of the cylindrical filter panel, one downstream in the direction of the exiting stream, the other upstream, set up in register with each other and both turned towards the cylindrical filter panel in cooperation with the relative rotary movement and a pump whose delivery is connected to the nozzle disposed downstream of the cylindrical filter panel.

In a configuration without fish to be saved, the take-off pipe may further comprise at least one debris concentrator.

According to one embodiment, the take-off pipe comprises two debris concentrators and a set of valves enabling alternate use of one of the concentrators or the other.

In a configuration with fish to save, the take-off pipe lacks any concentrator and the water, loaded with debris and fish, is discharged directly into a pipe or channel for return to the natural environment.

In practice, the low position of the circular filter cylinder substantially corresponds to the bottom of a sluice so equipped, whereas the high position of the cylindrical filter panel is, if possible, at the lower level than that of the low water level.

According to another aspect of the invention, the screen comprises at least two cylindrical filter panels placed one above the other in the vertical plane, between the low position and the high position, each suction device being connected to a common or separate take-off and the driving of the cylindrical filter panels being performed by drive means that are separate or common to both cylindrical filter panels.

According to still another embodiment, the screen is adapted to be housed instead of and in the place of a thru-flow band filter formed by a channel constituted by a bottom and two straight side walls where vertical guides are sealed, in which the frame of the thru-flow filter is capable of sliding and a rectangular opening on the maintenance deck generally bordered along its upstream side by a gutter adapted to receive detritus projected by the washing jets and a flat base of the civil engineering construction, said screen according to the invention being adapted to cooperate with the civil engineering construction of said thru-flow filter.

BRIEF DESCRIPTION OF THE DRAWINGS

Other features and advantages of the invention will appear in the light of the following detailed description and drawings in which.

DETAILED DESCRIPTION OF THE PREFERRED EMBODIMENTS

Figure 1:
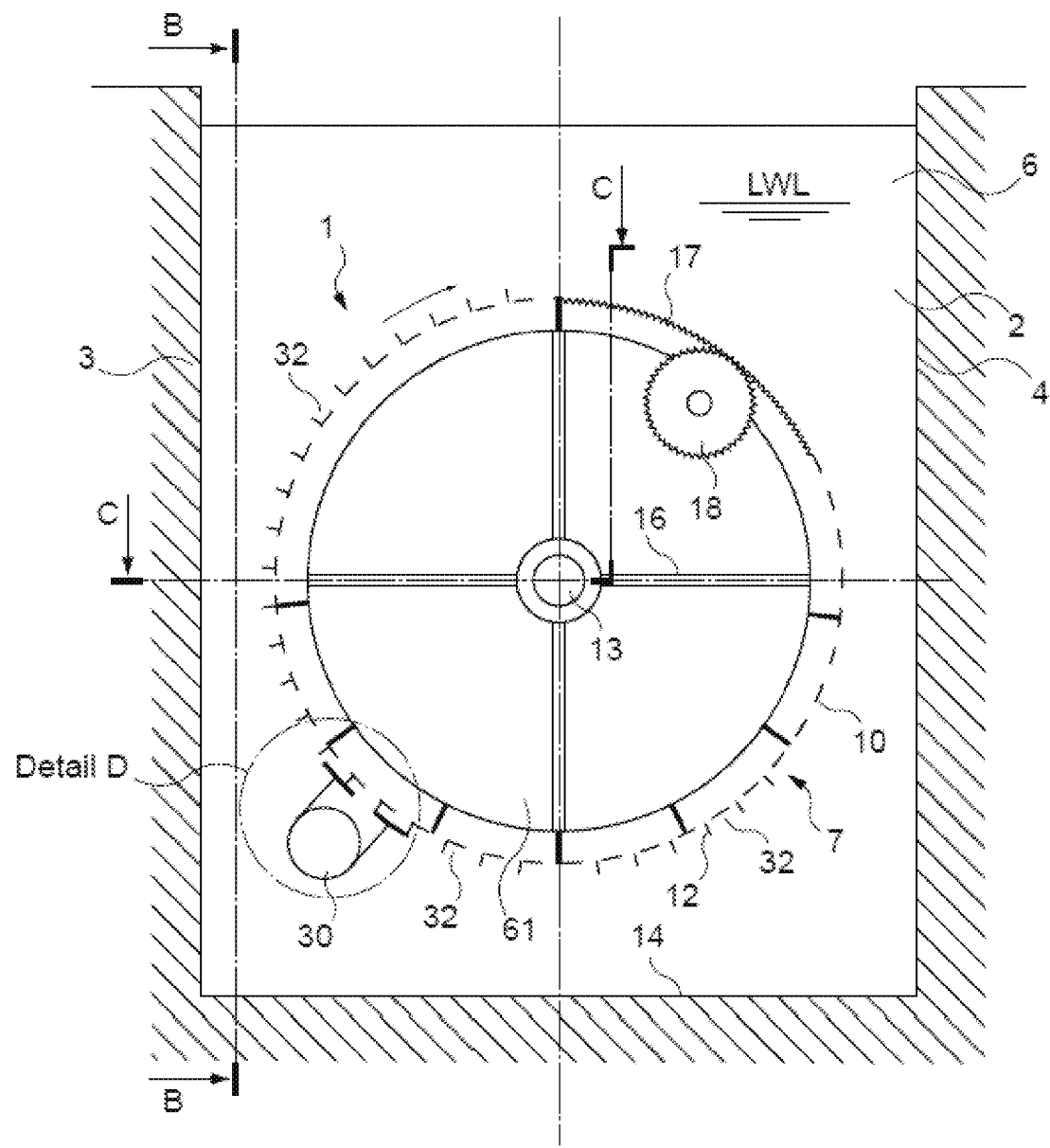
FIG. 1 is a cross-section view of a water intake sluice equipped with a cylindrical filter panel screen/device according to the invention, viewed from upstream.
Figure 2:
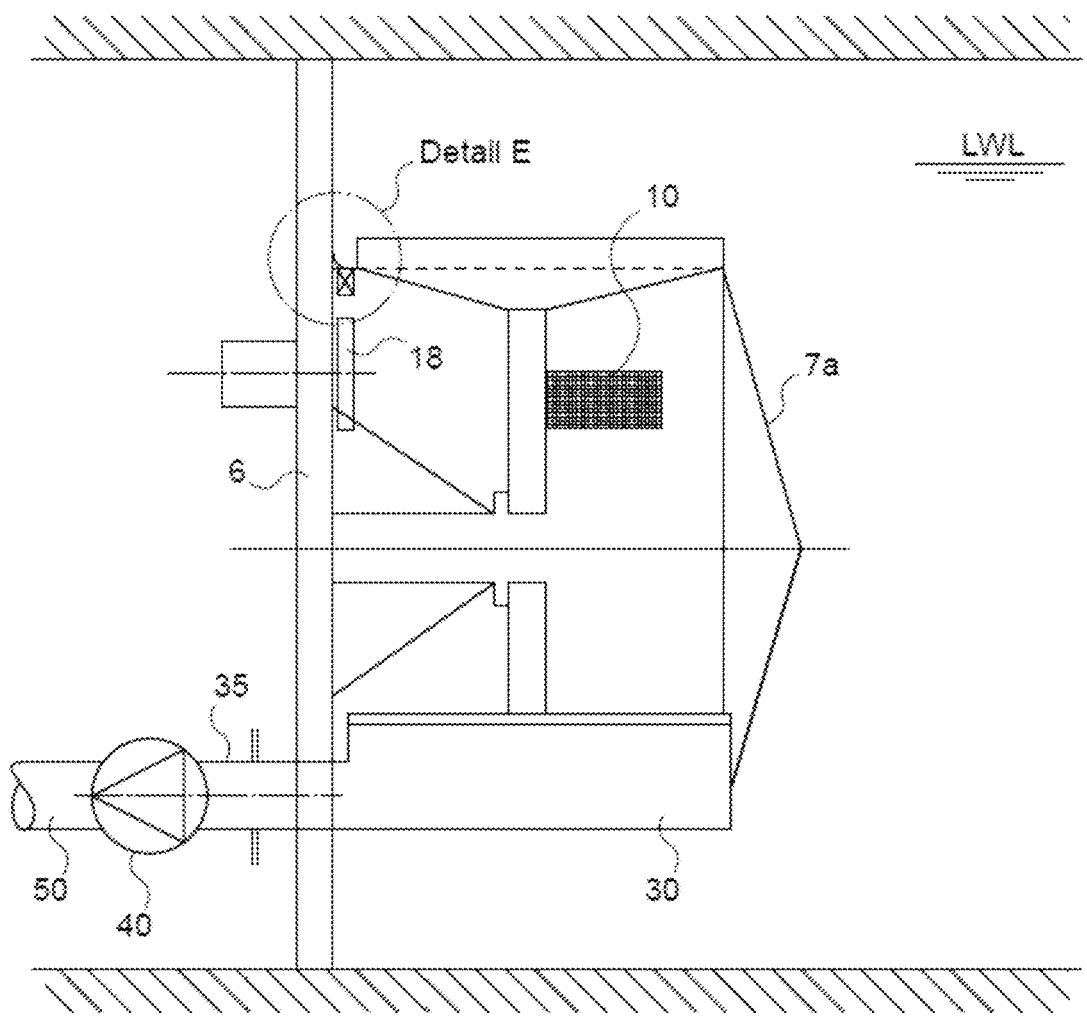
FIG. 2 is an elevation view in horizontal cross-section on BB of FIG. 1.
Figure 3:
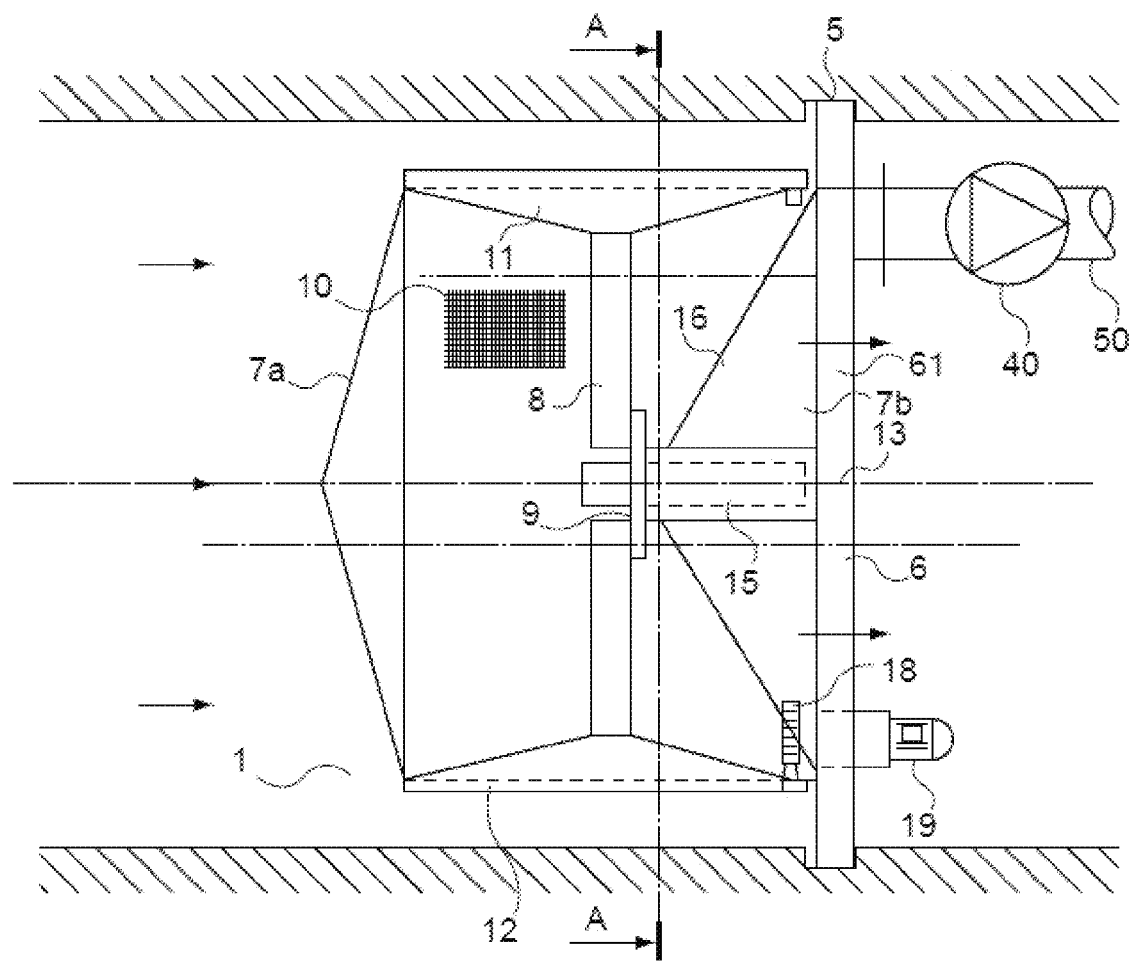
FIG. 3 is a horizontal cross-section view on CC of FIG. 1.

As illustrated in the drawings, a filter device with a filter member having a cylindrical filtration surface such as a cylindrical filter panel screen 1 is installed in a water intake channel or sluice 2 whose parallel masonry walls 3 and 4 each comprise, facing each other, a vertical guide 5 (FIG. 3). An installation comprising the channel and the filtration device is represented in FIGS. 1 to 3.

Such guides 5 are for example produced from metal and each form a groove as represented in FIG. 3.

The sluice 2 is equipped with a frame-forming wall or carrier plate 6 extending from one wall 3 to the other 4 and which is slid vertically in the guides 5. The plate 6 comprises a circular opening 61 substantially centered on the axis 13 of the plate 6. The low part of the circular opening 61 is more generally situated very close to the bottom 14 of the sluice 2. The circular opening 61 is obstructed by a cylinder 7 concentric with the opening 61 and which projects upstream relative to the carrier plate or frame 6 (FIG. 3). The cylinder 7 is constituted by several spokes 8, a hub 9, and a filter member 10 fastened to the periphery of the cylinder 7. The spokes 8 extend from the hub 9 to the cross-members 11 and are generally regularly distributed around the hub. These spokes 8 are fastened to the filter member 10. Longitudinal partitions 12 spaced from each other delimit in pairs compartments or retaining members for the various solid bodies (detritus and particles) stopped by the cylindrical filtration surface of the filter member 10. For example, the width of the partitions 12 is several centimeters from upstream to downstream. The partitions 12 are disposed at the periphery of the cylinder 7 and extend radially outwardly of the filter member 10, on going away therefrom. The partitions 12 are arranged longitudinally along genratrices of the cylinder 7, over its entire height.

The diameter of the cylinder 7 is preferably the greatest possible, that is to say slightly less than the width of the sluice 2, this being in order to maximize the area of the filtration surface. The height of the cylinder may also be modified and increased if need be. However, to avoid flexing of a cylinder that is too high under the action of its weight which, normally, would require the free end of the cylinder to be supported, it may be preferred to increase the diameter of the cylinder.

It should be noted that the water flows as indicated by the arrows in FIG. 3 from the outside to the inside of the filter cylinder before escaping in the downstream direction via the central opening in plate 6.

As a variant, the water flows from the inside of the filter cylinder to the outside and the retaining members are disposed inside the filter cylinder.

The lowest water level denoted LWL is generally situated at least at the upper level of the cylinder (FIG. 1). As a variant, the level LWL may be higher or lower depending on ancillary constraints.

The hub 9 of the cylinder is provided with mechanical journals and abutments known per se. The hub 9 is carried by a shaft 15 fastened to the plate or support wall 6 by radial arms 16.

In order to prevent water from passing from upstream to downstream of the filter cylinder 7 without passing via the filter member 10, the plate 6 extends at least to a level generally equal to or greater than the highest water level HWL not represented in the drawings.

As represented in FIG. 3, the cylinder 7 is obturated at its upstream end 7a which is opposite the downstream end 7b situated face to face with the central opening of the plate 6. The obturating wall 7a has for example a conical shape in this example for hydraulic reasons.

Figure 4:
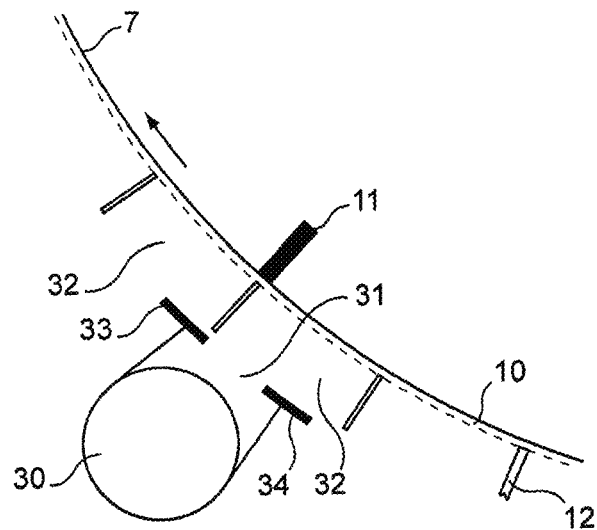
FIG. 4 reproduces at a larger scale the details referenced D and E of FIGS. 1 and 2.
Figure 4:
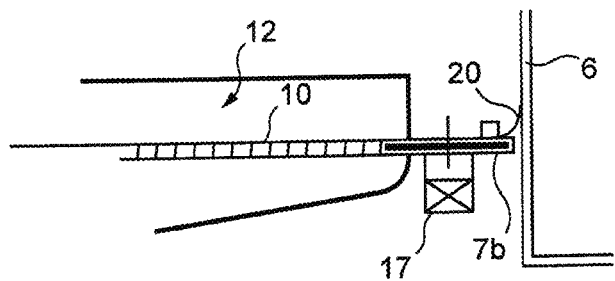

The cylinder 7, centered the hub 9, is rotationally driven by drive means comprising peripheral gear teeth 17, a pinion 18 and a drive motor 19 (FIGS. 1, 3 and 4, detail E).

It will be noted that a lip seal 20 is for example provided between the end 7b of the filter cylinder and the wall or plate 6.

Figure 5:
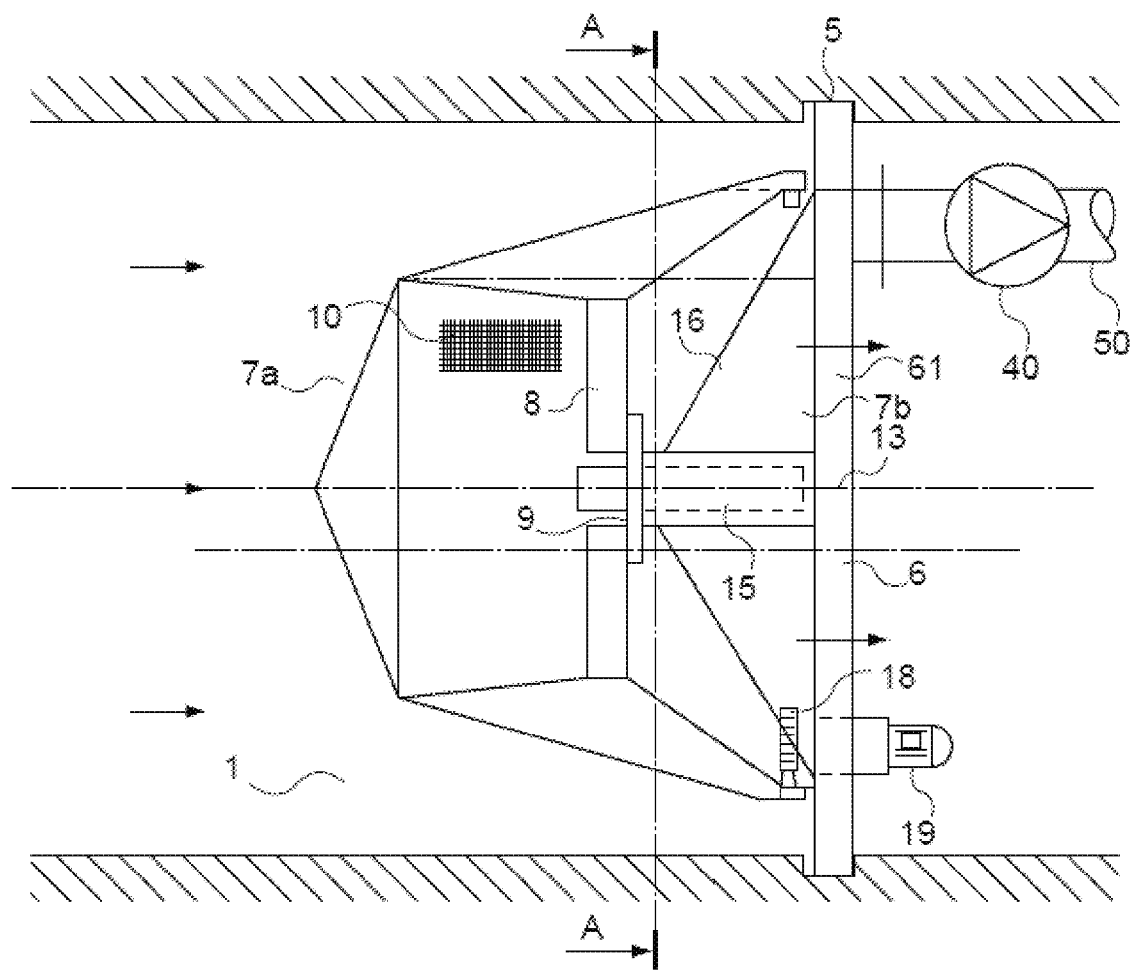
FIG. 5 is a horizontal view of an embodiment of the invention including a filter member with a frusto-conical filter surface.

As a variant, as shown in FIG. 5, the filter member which protrudes relative to the plate or wall 6 has a frusto-conical filter surface, with the base situated facing the opening of the plate or wall 6 and the point directed upstream.

A suction device is added onto the filter cylinder, comprising a longitudinal tangential nozzle 30 (FIGS. 1, 2 and 4) extending over the entire length of a generatrix of the cylinder 7. The nozzle 30 is fastened to the carrier plate 6 by one end (FIG. 2). The nozzle 30 comprises a cylindrical surface open over its full height by a slot or opening 31 which is axially arranged, that is to say along the generatrices of said cylindrical surface and which faces towards the cylinder 7. The edges of the slot are then spread apart from each other in order to enlarge the slot.

As represented in FIG. 1 and FIG. 4 (detail D) the cross-section of the nozzle thus formed has a U-shaped open profile the opening of which is directed towards the retaining members of the filter member 10.

In practice, the outside volume of the cylinder 7 equipped with the filter member 10 is fragmented in a circular manner into compartments 32 by the parallel longitudinal partitions 12 forming the retaining members. In a plan view from the cylinder 7, the nozzle 30 has a rectangular outline equivalent to or somewhat greater than once that of such a compartment.

The nozzle 30 has an opening 31 oriented to face the compartments 32 of the cylinder, which may be equipped with flexible lips 33, 34 in order to reduce the cross-section thereof, while enabling the occasional passage of bodies of greater size. The nozzle 30 is connected by a duct 35 to a suction unit such as a pump 40 fastened to wall 6, for example on the downstream side thereof. The pipe 35 thus for example passes through the wall 6 and provides the fastening of the nozzle 30 thereto.

The pump 40, supplied with power for example via a cable (not shown), is chosen so as to be able to pump large items of debris and, when necessary, of a type also capable of ensuring a very high survival rate for fish. The water conveying debris, fish and other forms of aquatic life is removed to its collection point by a duct 50.

As a variant, the suction device comprises two nozzles disposed respectively on opposite sides of the cylindrical filter member or panel, one downstream relative to the direction of the outgoing stream, the other upstream. These two nozzles are arranged in register with each other and are each turned towards the cylindrical filter panel in cooperation with the relative rotary movement and a pump whose discharge is connected to the nozzle is disposed downstream of the cylindrical filter panel.

According to another variant, the take-off pipe 50 comprises two debris concentrators (not shown) and a set of valves enabling alternate use of one of the concentrators or the other.

In a configuration with fish to save, the take-off pipe lacks any concentrator and the water loaded with debris and fish is discharged directly into a pipe or channel for return to the natural environment.

In FIGS. 1 to 3, an embodiment has been shown in which the suction device 30, 40 is fixed, whereas the drive means 17, 18, 19 are adapted to rotate the cylindrical filter member or panel.

As a variant (not shown), the filter member or panel is fixed whereas the drive means are adapted to rotate the suction device.

According to another variant (not shown), the drive means are adapted/configured to rotate both the suction device or devices (if there are several) and the cylindrical filter panel.

The description which has just been given in particular concerning the compartments, the suction device or devices, the relative movement between that device or devices and the filter member applies whatever the form of the filter member.

Figure 6:
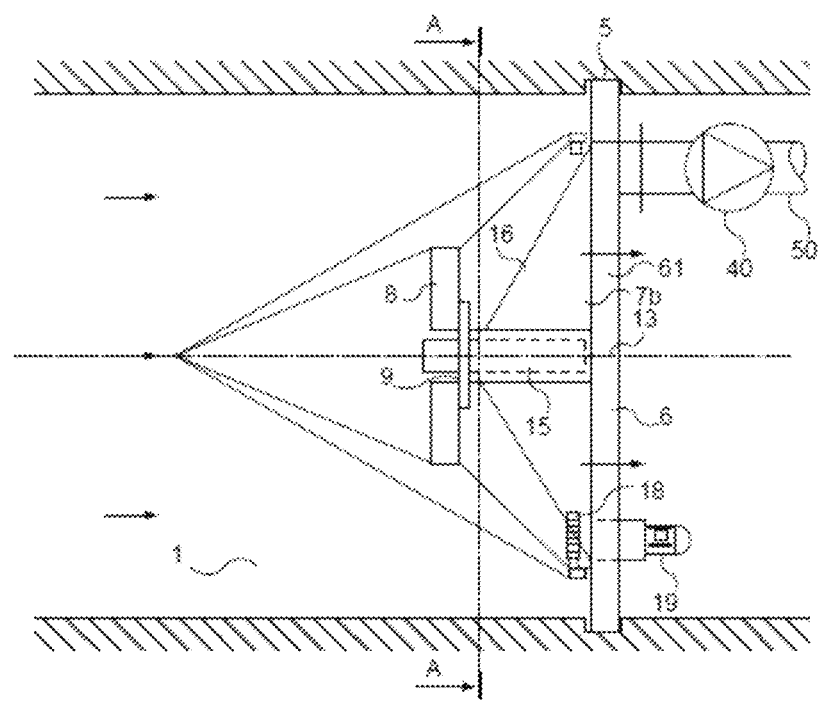
FIG. 6 is a horizontal view of an embodiment of the invention.

However, for a filter member of non-cylindrical form, such as frusto-conical (FIG. 5) or conical (FIG. 6), the retaining members or compartments have different suitable shapes (for example, a generally triangular shape for a cone), the same applying for the suction device.

The operation of the screen is the following: when not moving, the filter cylinder 7 is stopped, the pump 40 does not operate and the water flows through the filter member. Debris is stopped by the filter member 10 and retained in the longitudinal compartments 32 at the periphery of the cylinder. When it is desired to clean the filter 7, the pump 40 is started and the cylinder is rotated by the drive means 17, 18, 19. The cylinder turns and the peripheral compartments 32 pass in turn in front of the opening 31 of the nozzle 30. Each compartment is isolated from the general stream by the nozzle facade. The suction of the pump creates a flow in the compartment in the opposite direction to that of the normal screening and with a speed of the same order. The debris are sucked into the nozzle 30, though the pump 40, and are removed by the pipe 50.

If a piece of debris of large size situated in a compartment 32 jams the rotation of the cylinder, the drive system 17, 18, 19 stops by the effect of a load limiter known per se and rotation in the opposite direction is triggered, generally making it possible to get rid of the debris causing the jamming.

The washing pump 40 and the rotary movement are stopped at the end of the washing cycle.

When it is required to retrieve alive the fish and other forms of aquatic life stopped on the filter cylinder, the pump used is a suitable type known per se. The operation is normally automatic and controlled by the head loss generated by the filter cylinder, that is to say upon its fouling. Devices already known in themselves ensure the safety of the installation.

The size of the pieces of debris to suck away is limited by the grating of bars present in such water intake constructions. Those pieces of debris may then be stored while awaiting washing by virtue of the dimensions of the compartments, in particular thanks to the distance between the filter member surface and the free end of the longitudinal partitions of said compartments.

It is to be noted that the filtration device or screen according to the invention prevents any possibility of by-passing the system.

It does not generate significant turbulence in the outgoing stream either. It is thus more efficient than a dual flow band screen.

Such a device/screen according to the invention has the advantage of being able to be inserted by sliding in the vertical guides cooperating with bearing structures for thru-flow band screens.

The filter member 10 may have mesh openings of cylindrical, rectangular or square shape or slots with respective dimensions of the order of 10×10 to 0.5×0.5 mm.

The device/screen according to the invention also has an application for sluices that are inclined relative to the vertical plane.

It may even be mounted with the vertical axis and an outlet in a tunnel under the deck.

The invention claimed is:

1. An installation comprising:
a channel in which water flows, a water level in the channel being between a minimum water level and a maximum water level; and
a device which filters a stream of water having at least the minimum water level in the channel, the device comprising:
a frame-forming wall mounted in the channel and which comprises a substantially-central through-opening,
a filter member mounted on the frame-forming wall at the through-opening, the filter member comprising a frusto-conical filter surface projecting relative to the wall in the upstream direction, the frusto-conical filter surface having a larger area than would have a flat filter surface fitted in the through-opening, the filter member comprising retaining members provided in front of the frusto-conical filter surface upstream thereof or downstream according to the direction of flow of the water, in order to retain solid bodies that do not pass through the frusto-conical filter surface, the filter member being movable, an uppermost portion of the filter member being disposed at most at the minimum water level during filtration of the stream of water flowing through the channel, at least one suction device which is disposed opposite the retaining members upstream thereof, and a drive system including peripheral gear teeth, a pinion, and a drive motor, the gear teeth extending from a peripheral end of the filter member and engaging with the pinion, the drive motor driving the pinion which engages the gear teeth for rotationally driving the filter member in a relative movement between the filter member and the at least one suction device such that each retaining member is successively brought in front of the at least one suction device in order to locally generate, through the filter member, a counter-flow of water successively opposite each retaining member.

2. The installation according to claim 1, wherein the axis of revolution of the frusto-conical filter surface is disposed perpendicularly to the through-opening of the frame-forming wall.

3. The installation according to claim 1, wherein the retaining members are disposed along generatrices of the frusto-conical filter surface.

4. The installation according to claim 3, wherein the retaining members comprise two partitions spaced apart, arranged along the generatrices of the frusto-conical filter surface.

5. The installation according to claim 1, wherein the suction device, or each suction device when a plurality of suction devices is provided, comprises a suction unit and a suction nozzle.

6. The installation according to claim 5, wherein the suction nozzle is of elongate general shape and comprises an envelope-forming wall which, in cross-section, has an open profile provided with an opening face to face with the retaining members.

7. The installation according to claim 6, wherein, in plan view, the opening has a substantially rectangular outline of dimensions equal to or greater than those of the facing retaining members.

\* \* \* \* \*